July 6, 1965   HIROSHI TADO   3,192,911
FUEL INJECTION SYSTEM FOR MULTI-ROTOR ROTARY ENGINES
Filed May 29, 1962   4 Sheets-Sheet 1

Inventor
Hiroshi Tado
By Stevens, Davis, Miller & Mosher
Attorneys

July 6, 1965  HIROSHI TADO  3,192,911
FUEL INJECTION SYSTEM FOR MULTI-ROTOR ROTARY ENGINES
Filed May 29, 1962  4 Sheets-Sheet 2

Inventor
Hiroshi Tado
By Stevens, Davis, Miller + Mosher
Attorneys

July 6, 1965  HIROSHI TADO  3,192,911
FUEL INJECTION SYSTEM FOR MULTI-ROTOR ROTARY ENGINES
Filed May 29, 1962  4 Sheets-Sheet 3
Fig. 6
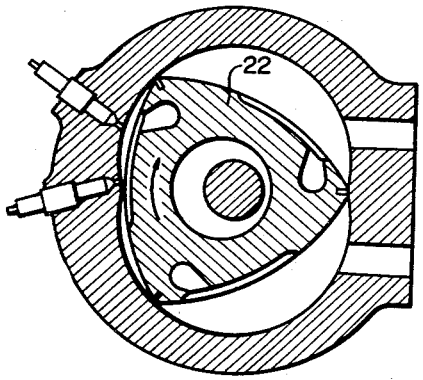
Fig. 7
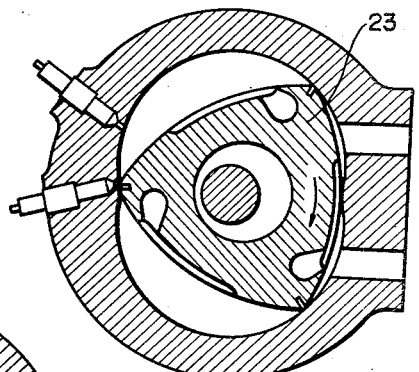
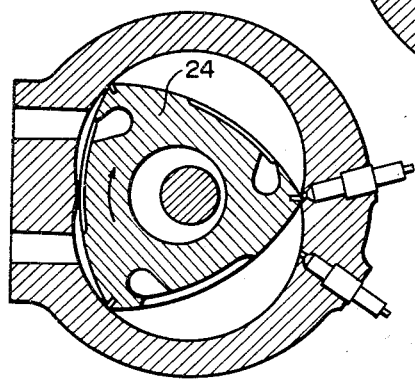
Fig. 8
Inventor
Hiroshi Tado
By Stevens, Davis, Miller + Mosher
Attorneys July 6, 1965  HIROSHI TADO  3,192,911
FUEL INJECTION SYSTEM FOR MULTI-ROTOR ROTARY ENGINES
Filed May 29, 1962  4 Sheets-Sheet 4

Inventor
Hiroshi Tado
By Stevens, Davis, Miller & Mosher
Attorneys

United States Patent Office 3,192,911
Patented July 6, 1965

3,192,911
FUEL INJECTION SYSTEM FOR MULTI-ROTOR
ROTARY ENGINES
Hiroshi Tado, Suita-shi, Osaka, Japan, assignor to Yanmar
Diesel Engine Co., Ltd., Kita-ku, Osaka, Japan, a corporation of Japan
Filed May 29, 1962, Ser. No. 198,591
Claims priority, application Japan, July 28, 1961,
36/26,766
2 Claims. (Cl. 123—8)

The present invention relates to rotary engines and particularly concerns the combined arrangement of the combusion chambers and the fuel injection system in rotary engines having an even number of rotors each provided with two fuel injection valves.

In the fuel injection system for rotary engines requiring two fuel injection valves for each of the engine rotors, a fuel injection pump is required which is intended for use with multi-cylinder engines having cylinders twice as many as the number of rotors of the particular rotary engine. On the other hand, with rotary engines having an even number of rotors, the manner in which the combusion chambers and the fuel injection system are combined and arranged relative to each other is critically important for the centrifugal balancing of rotating parts and the alleviation of bearing loads occurring with fuel combustion.

The present invention has for its object to provide a fuel injection system of the type described above having fuel injection pumps reduced in number to that of rotors while suitably arranging the combustion chambers and the fuel injection system to improve the balancing and alleviate the bearing loads thereby to provide a rotary engine which is easy to manufacture and inexpensive.

According to the present invention, there is provided a combined arrangement of the combustion chambers and the fuel injection system in a multi-rotor rotary engine of the type having two fuel injection valves for each rotor characterized in that it comprises a pair of fuel injection valves for each of two rotors arranged eccentrically apart 180 degrees relative to each other in the direction of rotation with respect to the center of the epitrochoidal curve of the engine housing, a pair of rotors mounted on a single rotor shaft eccentrically apart 180 degrees, a pair of two fuel injection pumps for supplying fuel at high pressure, one of said fuel injection pumps being connected in parallel with the auxiliary fuel injection valves for said pair of rotors while the other fuel injection pumps is connected in parallel with the main fuel injection valves for said pair of rotors.

The present invention will now be described in detail with reference to the accompanying drawings which illustrate some embodiments of the invention.

Figure 4:
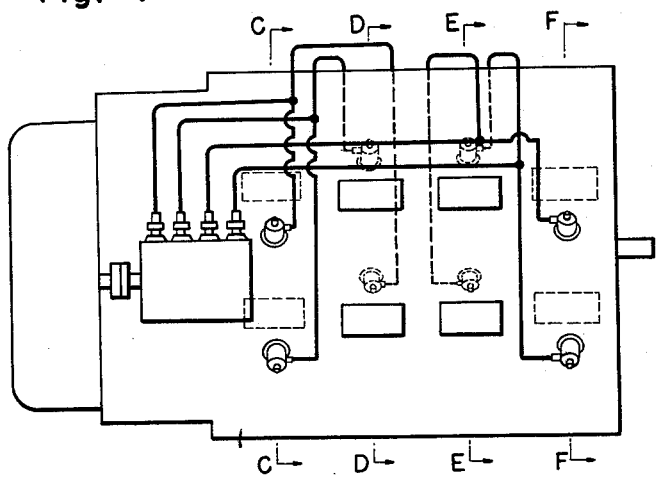
FIG. 4 is an exterior view similar to FIG. 1 of a rotary engine having four rotors.
Figure 5:
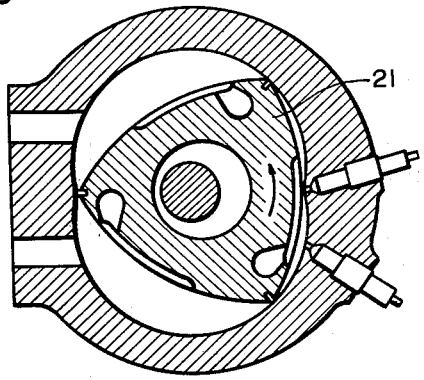
Figure 9:
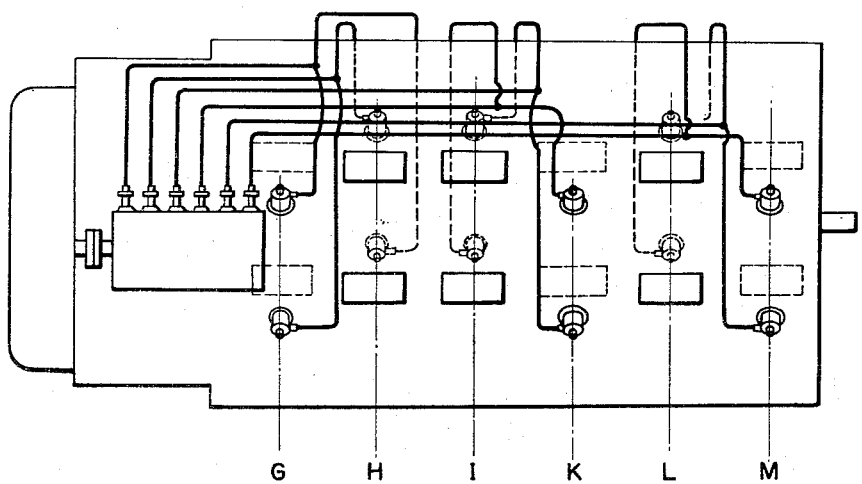
Figure 10:
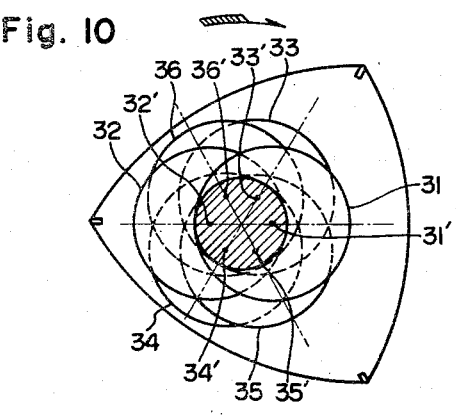

FIGS. 5 to 8, inclusive, are cross-sectional views taken along the lines C—C, D—D, E—E and F—F, respectively, in FIG. 4;

FIG. 9 is an exterior view of a rotary engine having six rotors as viewed from the fuel pump side; and FIG. 10 is a schematic diagram showing angular phase relationships between the rotors.

First, a two-rotor type rotary engine as a basic form of the invention will be described. The embodiments of the four-rotor and six-rotor types, which will be described later, may properly be regarded a combination of units of the above basic form.

Figure 2:
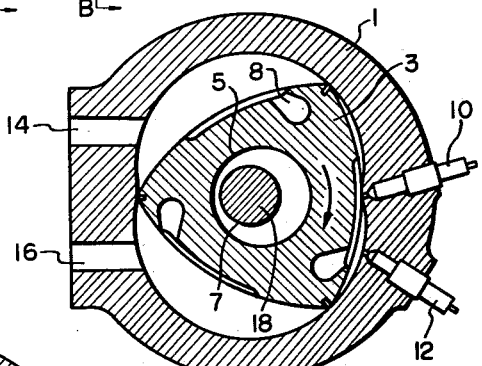
FIGS. 2 and 3 are cross-sectional views taken along the lines A—A and B—B, respectively, in FIG. 1.
Figure 3:
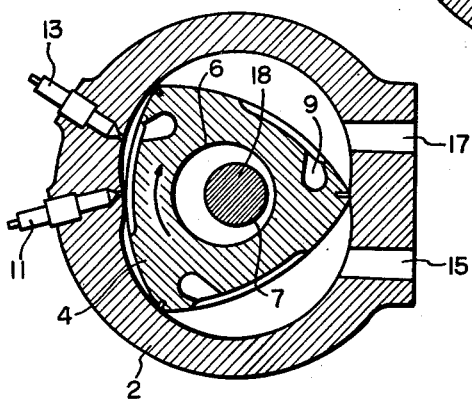

Referring to FIGS. 2 and 3, numerals 1 and 2 indicate a first and a second housing, respectively, having an interior profile corresponding to an epitrochoidal curve; and 3 and 4 indicate a first and a second rotor mounted within said respective housings with radially outward edges of said rotors held in sliding contact with the inner walls of said respective housings. Numerals 5 and 6 indicate bearing bores formed in said respective rotors for rotatably mounting the latter on the eccentric portions of a rotor shaft 7 by way of bearing means, said rotor shaft 7 extending axially through the housings. Numerals 8 and 9 indicate auxiliary combustion chambers formed in the rotor. 10 and 11 indicated a first and a second auxiliary injection valve; 12 and 13, a first and a second main injection valve; 14 and 15, suction ports; and 16 and 17, exhaust ports.

The direction in which the rotors are rotated is indicated by the arrow. As shown, fuel injection valves 10–12 for the first rotor 3 as well as injection valves 11–13 for the second rotor 4 are arranged in symmetry with respect to the common axis 18 of the housings as a center of the epitrochoidal curves. As shown, the rotors 3 and 4 are mounted on a common rotor shaft 7 eccentrically apart 180 degrees.

The operation of the above described engine will now be described in brief. Referring to FIG. 2, the rotor 3 defines three working chambers together with inner wall of the housing 1. With rotation of the rotor 3, each of the working chambers takes air through the suction port 14 and subsequently compresses the air. As the compression proceeds, fuel is injected first through the auxiliary injection valve 10 and then through the main injection valve 12 to be ignited for combustion. The combustion gases now expand driving the rotor and thereafter are exhausted exteriorly through the exhaust port 16. On this occasion, it is understood that the rotor is arranged to rotate in the same direction as the rotor shaft and at a velocity ratio to the latter of 3 to 1.

Figure 1:
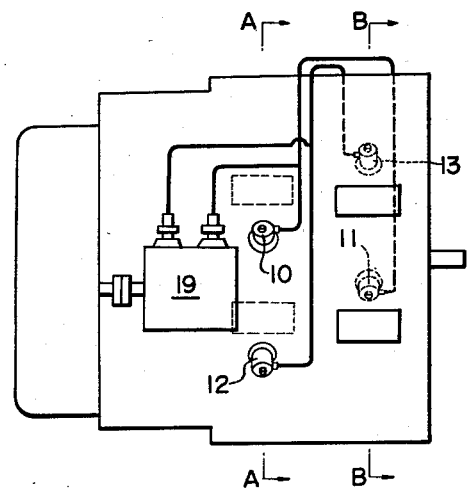
FIG. 1 is an exterior view of a rotary engine having two rotors as viewed from the fuel pump side.

Referring to FIG. 1, numeral 19 designates two fuel injection pumps for two cylinder engines, the number of the fuel pump being the same as that of rotors of this rotary engine. As shown, one of the two fuel injection pumps is connected in parallel with the auxiliary injection valves 10 and 11 for the respective rotors and the other fuel injection pump is connected in parallel with the main injection valves 12 and 13 for the respective rotors for supplying fuel at high pressure. The above arrangement of this invention only requires injection pumps for two-cylinder engines contributing to reduction in production cost, whereas conventional arrangements have generally required those for four-cylinder engines. Also, according to the present invention, the pair of rotors and eccentric rotor shaft portions are balanced under centrifugal action to afford satisfactory engine balance. In addition, the pair of rotors are subjected to fuel combustion at the same time, and which reduces the loading upon the intermediate bearing substantially to zero while alleviating the loading on the opposite end bearings. It will be understood that the intermediate bearing may be eliminated if desired.

According to the present invention, even with rotary engines having two rotors, the bearing structure for the rotor shaft may take substantially the same form as with single-rotor rotary engines, rendering the fabrication of two-rotor rotary engines relatively easy and inexpensive.

With multi-rotor rotary engines having an even number more than two of rotors, the number of fuel injection pumps may be reduced while improving the balancing of rotative parts and the load conditions of bearing structures by arranging a required number of pairs of rotors at appropriate angular phases as in the above described embodiment.

FIGS. 4 to 8, inclusive, illustrate such arrangement for four-rotor rotary engine. In FIGS. 5 to 8, numerals 21 to 24 indicate first, second, third and fourth rotors. The fuel injection valves are arranged such that those for the first 21 and fourth 24 rotors and those for the second 22 and third 23 rotors are on the respective sides, the valve group for the first and fourth rotors being positioned with respect to the valve group for the second and third rotors to be eccentrically apart 180 degrees in the direction of rotation with respect to the center of the epitrochoidal configuration. The rotors are arranged with respect to the rotor shaft such that the first 21 and third 23 rotors on one hand and the second 22 and fourth 24 rotors on the other hand have the same phase and that the group of the first and third rotors is positioned with respect to the group of the second and fourth rotors to be eccentrically apart 180 degrees. It will be observed that explosion takes place twice for each revolution of the rotor shaft at equal intervals.

FIG. 9 illustrates the arrangement for a six-rotor rotary engine and in this figure, reference characters G, H, I, K, L and M indicate respective axial positions of the first, second, third, fourth, fifth and sixth rotors. As will be observed, the fuel injection valves are arranged such that those for the first, fourth and sixth rotors and those for the second, third and fifth rotors are on the respective opposite sides, the valve group for the first, fourth and sixth rotors being positioned with respect to the valve group for the second, third and fifth rotors so as to be eccentrically apart 180 degrees in the direction of rotation with respect to the center of the epitrochoidal configuration. FIG. 10. schematically illustrates the phase relationship between the rotors, circles 31 to 36, inclusive, representing the respective eccentric shaft portions for the first, second, third, fourth, fifth and sixth rotors and having respective centers at points indicated by numerals 31', 32', 33', 34', 35' and 36'. The rotor shown represents the first rotor. Pairs of rotors, the first and second, the third and fourth, and the fifth and sixth, are arranged with respect to each other to be eccentrically apart 180 degrees therein, while the first, fourth and sixth rotors are positioned at intervals of 120 degrees.

It will be appreciated, therefore, that a completely dynamically balanced state is attained with the explosion ocurring three times for each revolution of the rotor shaft at regular intervals. The group of the third and fourth rotors and the group of the fifth and sixth rotors may be exchanged with each other as will readily be understood.

What is claimed is:
1. A rotary piston internal combustion engine comprising a housing with at least two separate axially spaced cavities, with the inner surface of the peripheral wall of each cavity having a two lobe epitrochoidal profile, and said profiles of each cavity being in axial alignment with each other, a single shaft extending through both of said cavities, a rotor mounted in each cavity and disposed on said shaft for rotating the shaft, said shaft having eccentrics fixed thereto, one eccentric being disposed in each cavity, said eccentrics being offset 180° apart from the other, each rotor being mounted for relative rotation about its eccentric as its eccentric rotates, a main and an auxiliary fuel injection valve in communication with each cavity for supplying fuel to rotate said rotor therein, said main and auxiliary valves of said separate cavities being disposed on diametrically opposite sides of said shaft, and two fuel injection pumps, one fuel pump being connected to each of said auxiliary valves and the other fuel pump to each of said main valves for supplying fuel when the rotors are at their compression stage.

2. A rotary piston internal combustion engine comprising a housing with at least three separate axially aligned spaced cavities, with the inner surfaces of the walls of each cavity having a two lobe epitrochoidal profile, said profiles being axially aligned and symmetrical with respect to each other, a single shaft extending through said cavities, a rotor in each cavity for rotating said shaft, said shaft having eccentrics fixed thereto, one eccentric being disposed in each cavity, said eccentrics being offset 180° apart from the immediately adjacent eccentrics, each rotor being mounted for relative rotation about its eccentric as its eccentric rotates, a main and auxiliary fuel injection valve for each cavity communicating a supply fuel thereto, the main and auxiliary valves of adjacent cavities being disposed on diametrically disposed sides of said shaft, and a main fuel injection pump being connected to all said main fuel valves to supply fuel thereto when the rotors are at their high compression stage and an auxiliary fuel injection pump connected to all said auxiliary valves to supply fuel thereto.

References Cited by the Examiner

UNITED STATES PATENTS

| | | | |
|---|---|---|---|
| 2,933,073 | 4/60 | Knudson | 123—139.15 |
| 3,077,867 | 2/63 | Froede | 123—8 |

KARL J. ALBRECHT, *Primary Examiner.*

JOSEPH H. BRANSON, JR., *Examiner.*